Dec. 29, 1925.
A. J. RUSSELL
1,567,468
CLIP FOR RUBBER HOSE JOINTS
Filed Feb. 21, 1924
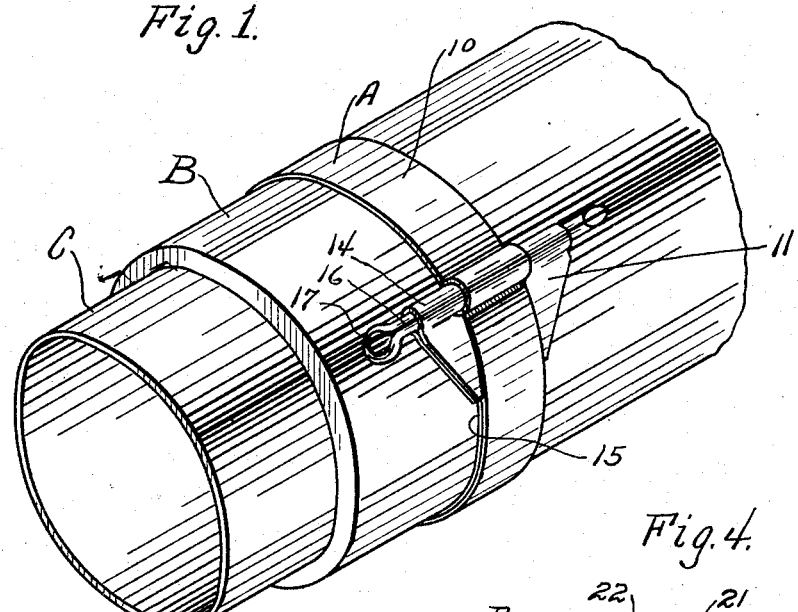
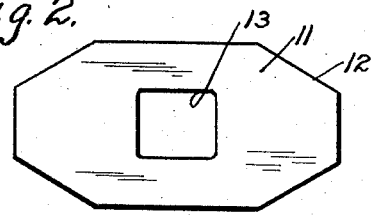
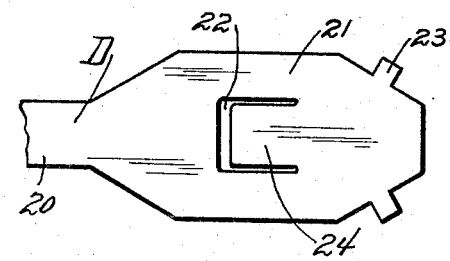
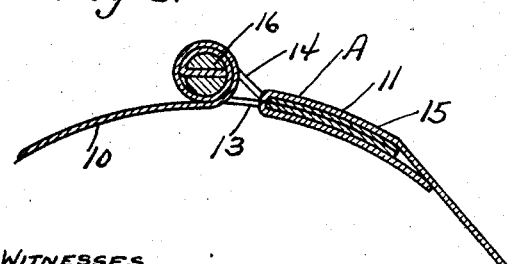
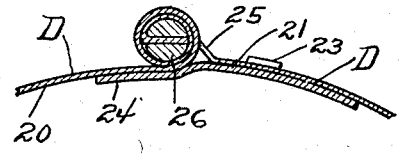
Inventor
Albert Jacob Russell Patented Dec. 29, 1925.

1,567,468

UNITED STATES PATENT OFFICE.

ALBERT JACOB RUSSELL, OF JOHANNESBURG, SOUTH AFRICA.

CLIP FOR RUBBER-HOSE JOINTS.

Application filed February 21, 1924. Serial No. 694,395.

*To all whom it may concern:*

Be it known that I, ALBERT JACOB RUSSELL, a subject of the King of Great Britain, residing at Johannesburg, South Africa, have invented certain new and useful Improvements in a Clip for Rubber-Hose Joints, of which the following is a specification.

This invention appertains to novel means for making hose connections and the primary object of the invention is the provision of a novel clip for effectively compressing and holding a rubber hose tightly about a pipe, nipple or other device with which it is connected.

A further prime object of the invention is the provision of an improved clip for compressing a rubber hose around a pipe or the like embodying an annular open band, having novel means including a rotatable key for taking up the slack in the band and compressing the same in intimate contact with the pipe.

A still further object of the invention is the provision of novel clip for facilitating the connection of a rubber hose with the radiator and water jacket of an internal combustion engine, of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:

Figure 1 is a perspective view of the improved clip showing the same in use for holding a rubber hose on a pipe or the like.

Figure 2 is a plan view of the buckle blank.

Figure 3 is an enlarged fragmentary longitudinal section through the improved clip illustrating the means for adjustably connecting the terminals of the clip together.

Figure 4 is a detail perspective view of one end of a modified form of clip prior to the same being folded for forming the buckle, and Figure 5 is an enlarged fragmentary longitudinal section through the modified form of the clip illustrating the means for adjustably connecting the terminals of the clip together.

Referring to the drawings in detail, wherein similar reference characters designate corresponding parts throughout the several views, the letter A generally indicates one form of the improved clip which can be utilized for holding a rubber hose B on a pipe terminal C.

The improved clip A comprises an annular band of sheet metal 10 which is adapted to encircle the hose B, so as to hold the same tightly in engagement with the pipe C. In accordance with the invention, I provide a buckle 11 which is preferably stamped from a single blank of sheet metal as clearly shown in Figure 2 of the drawing. This buckle blank 11 is of an elongated form and has it corners cut off as at 12, as clearly shown in the drawing. The blank is then provided with an opening 13 at its center, after which the blank is folded back upon itself at the transverse axis thereof. When the blank is folded, the opening 13 forms a substantial square-shaped notch in the buckle at one edge thereof at a point intermediate its ends. The blank on each side of the notch or opening 13 is then shaped to provide hinge barrels 14 as can be clearly seen by referring to Figure 1 of the drawing. One end of the band 10 is folded back upon itself to form a loop 15 which receives and embraces the buckle 11. The band 15 fits in the notch formed by the opening 13, which prevents relative movement of the buckle 11 relative to the band. By making the loop 15 larger or smaller, the band 10 can be initially adjusted to the size of the hose, around which it is to be fitted. The pivot or hinge barrels 14 rotatably receives a split pin 16 having a head 17 formed on one end thereof. The pin 16 is formed of resilient material and when the same is split, the legs thereof frictionally engage the barrels 14 so as to normally prevent rotation thereof. The free end of the band is now inserted in the split portion of the pin 16 and by inserting a suitable instrument such as a screw driver or the like in the head 17, the pin can be rotated, which will wind up the terminal of the band, which is not attached to the buckle 11 around the pin 16, thus effectively tightening the band and forcing the hose into intimate contact with the pipe C. This of course prevents accidental displacement of the hose from off of the pipe and forms a fluid tight connection therewith.

In Figures 4 and 5, I have shown a modified form of the clip which is designated by the reference character D.

In this form, I provide an annular band 20 having the elongated head 21 formed on one terminal thereof. The head 21 at its central portion is provided with a U-shaped slot 22 as clearly shown in Figure 4 of the drawing. The head 21 is folded on a transverse center back on itself, as clearly shown in Figure 4 of the drawing and the folded portion of the head is held in its folded position by means of tongues 23 which are bent over the head. When the head is folded as described, a guide tongue 24 is provided by the U-shaped slot 22 and this guide tongue 24 projects beyond the forward edge of the head. On each side of the slot 22 the head is bent to form hinge barrels 25 for rotatably receiving the split pin 26 which is of the same configuration and formation as the pin 16. In use of this form of the band, the same is placed around the hose, and the free end thereof cut off to conform to the general size of the hose, after which the free end is inserted through the split portion of the pin, and the pin is rotated so as to take up slack in the band and bring the same in tight contact with the hose. The tongue 24 forms a guide for the free end of the band as can be clearly seen from Figure 5 of the drawing.

From the foregoing description, it can be seen that I have provided an improved clip of exceptionally simple and durable construction for effectively holding a rubber hose or the like on the end of a pipe.

Changes in details may be made without departing from the spirit or the scope of the invention.

What I claim as new is:

1. A hose clip formed from a single piece of sheet metal and having at one end a band portion of ribbon-like formation, an elongated head formed on one terminal of the band and provided at its central portion with a slot, tongues projecting laterally from the end of the head remote from the band, said head being doubled and bent to form spaced hinge barrels, said tongues being bent over the portion of the head adjacent the band to retain the extremity of the head in bent position, the slot affording space for admission of the end of the band between the sides of the head.

2. A hose clip formed from a single piece of sheet metal and having at one end a band portion of ribbon-like formation, an elongated head formed on one terminal of the band and provided at its central portion with a slot, tongues projecting laterally from the end of the head remote from the band, said head being doubled and bent to form spaced hinge barrels, said tongues being bent over the portion of the head adjacent the band to retain the extremity of the head in bent position, the slot affording space for admission of the end of the band between the sides of the head, the slot being of U-shape and the portion between the sides of the U being extended forwardly to form a guide for the ends of the tongues.

In testimony whereof I affix my signature.

ALBERT J. RUSSELL.